United States Patent [19]

Zborowski

[11] Patent Number: 4,681,177

[45] Date of Patent: Jul. 21, 1987

[54] METHOD AND APPARATUS FOR TENSIONING FRICTIONALLY DRIVEN, GROUND ENGAGING BELTS

[75] Inventor: David G. Zborowski, Bettendorf, Iowa

[73] Assignee: Caterpillar Inc., Peoria, Ill.

[21] Appl. No.: 806,918

[22] Filed: Dec. 9, 1985

[51] Int. Cl.[4] .............................................. B62D 55/30
[52] U.S. Cl. ................................. 180/9.56; 180/9.52; 180/9.54; 305/32
[58] Field of Search ........................ 180/9.0, 9.1, 9.52, 180/9.54, 9.56; 280/111, 112 R; 305/32, 29

[56] References Cited

U.S. PATENT DOCUMENTS

| | | |
|---|---|---|
| 1,522,157 | 1/1925 | Tracy et al. |
| 2,535,254 | 12/1950 | Attwell ................................ 180/9.1 |
| 3,329,227 | 7/1967 | Nodwell et al. ..................... 180/9.6 |
| 3,510,174 | 5/1970 | Lamb .................................... 305/27 |
| 3,597,017 | 8/1971 | Tanaka et al. ....................... 305/32 |
| 3,758,169 | 9/1973 | Trapp .................................... 305/32 |
| 3,826,325 | 7/1974 | Purcell et al. ..................... 180/9.54 |
| 4,221,272 | 9/1980 | Kell .................................... 180/190 |
| 4,283,093 | 8/1981 | Cline .................................... 305/32 |
| 4,519,654 | 5/1985 | Satzler et al. ..................... 180/9.54 |

Primary Examiner—John J. Love
Assistant Examiner—Donn McGiehan
Attorney, Agent, or Firm—Joseph W. Keen

[57] ABSTRACT

Method and apparatus for tensioning an endless, inextensible, elastomeric ground engaging belt into frictional driven engagement with a driver wheel structure, oscillatably supporting an axle on which an idler wheel structure associated with the drive wheel structure is mounted, and accommodating recoil of the idler wheel structure. Such associated wheel structures are arranged on each lateral side of a vehicular main frame and are entrained by the ground engaging belt. The idler wheel structures are rotatably mounted on opposite ends of the axle extending laterally relative to the main frame. The axle is oscillatably mounted to the main frame about an oscillation axis parallel to the vehicle's longitudinal axis to accommodate uneven terrain and about a vertical axis to permit substantially independent recoil of the respective idler wheel structures. A pair of spring assemblies mounted on opposite lateral sides of the oscillation axis biasingly pull the axle in a direction away from the driver wheel structures to maintain the desired orientation of the axle about its laterally extending axis of rotation.

21 Claims, 12 Drawing Figures

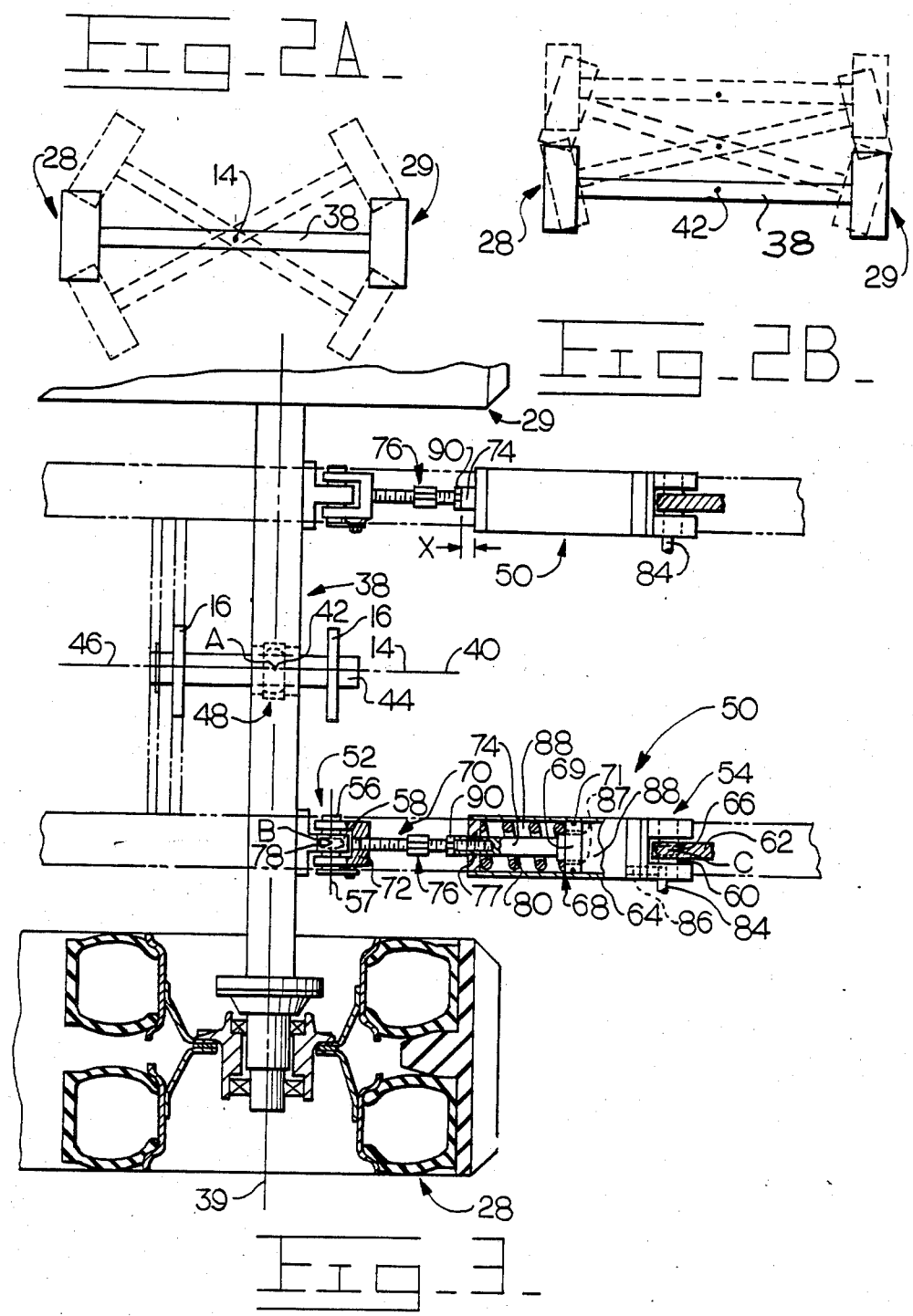

METHOD AND APPARATUS FOR TENSIONING FRICTIONALLY DRIVEN, GROUND ENGAGING BELTS

DESCRIPTION

1. Technical Field

This invention relates to frictionally driven, vehicular propulsion belt systems and, more particularly, to maintaining tension in belts used in those systems.

2. Background Art

Track laying work vehicles usually enjoy tractive advantages over vehicles of comparable size and horsepower utilizing ground engagement wheels. Such tractive advantage results primarily from the larger footprint or engagement area of the track with the underlying terrain relative to that of comparably sized and powered vehicles utilizing a customary, practical number of drive wheels. To maximize that advantage, it is necessary to maximize the area of track engagement with the ground.

On track laying vehicles such as that illustrated in U.S. Pat. No. 3,826,325 which issued July 30, 1974, each track roller frame (about which the track is entrained) is pivotally mounted to the vehicle's main frame about a laterally extending pivot shaft located proximal the rear of the vehicle. The track roller frame and associated track pivot about such pivot shaft in response to underlying terrain which is uneven in the longitudinal travel direction of the vehicle for the purpose of conforming to and maintaining maximum track contact with the ground.

Equalizer bar apparatus, used on some track laying vehicles, are oscillatably connected intermediate their ends to the vehicular main frames about longitudinal pivot pins and are pivotally connected to the respective track roller frames proximal the roller frames' longitudinal front ends. Such equalizer bar apparatus accommodate lateral unevenness in the terrain (i.e., terrain elevation differences between the track roller frames which are arranged on opposite lateral sides of the vehicular main frame). The equalizer bar apparatus tend to equalize the loads on the track roller frames and maximize the area of track engagement with the ground when terrain conditions are uneven in the lateral direction.

Track used on track laying vehicles is entrained about one or more idler wheels and a drive sprocket. Each idler wheel has a lateral axis of rotation and is supported by a track roller frame. Each drive sprocket interengages the track and drives same about the idler(s). At least one of the idlers is mounted near the front end of the vehicle and is biased in a forwardly direction to maintain the appropriate track tension but will, upon injestion of debris or upon longitudinal engagement of an obstacle, recoil in a rearwardly longitudinal direction against such biasing. On track laying vehicles relative movement between the track roller frame and the front idler is generally constrained along a line between the front idler and, depending on track configuration, rear idler or drive sprocket, by a substantial guide member(s) therebetween designed to resist forces tending to move the idler in a nonlongitudinal direction. Due to the pivotal connection of the track roller frames with the equalizer bar apparatus and with the pivot shafts, the orientation of the front idlers' axes of rotation remains substantially horizontal regardless of vehicle orientation.

An example of such track laying vehicle structure is illustrated in U.S. Pat. No. 1,522,157 ('157) which issued Jan. 6, 1925. In '157 the pivotal connection between the equalizer bar apparatus and each roller frame was provided through the idler wheels' spindles. A tensioning device on opposite lateral sides of each idler were required to avoid cocking of the idler during oscillation and recoil thereof. However, cocking of the idler wheels relative to their associated drive sprockets inevitably occurs due to the oscillation capability of the equalizer bar. Such cocking causes the track to assume a twisted configuration which is not conducive to long life or reliable operation.

Belt laying vehicles such as the vehicle illustrated in U.S. patent application Ser. No. 563,338, filed Dec. 20, 1983, which have no track roller frame, retain the desired objective of maintaining the maximum engagement area between the ground engaging belts and underlying terrain. The idlers on opposite lateral sides of a belt laying vehicle lacking roller frames are desirably mounted on an axle which is oscillatably mounted about an axis parallel to the vehicle's longitudinal axis in order to obtain the side-to-side load sharing provided to track laying vehicles by the aforementioned equalizer bar apparatus. Substantially independent recoil capability of such idlers also remains a desired objective on belted vehicles for the previously discussed reasons.

Use of a spherical bearing to connect the idler axle and vehicle's main frame accommodates the aforementioned degrees of operational freedom but also permits the axle to rotate about its laterally extending axis. Upon application of an external torque such as idler wheel bearing drag or brake reaction, the idler axle is free to rotate about its lateral axis and cause damage to the connecting structure. Additional means longitudinally separated from such connecting structure resist such externally applied torque but require extra structure, greater weight, and higher vehicle manufacturing cost. Use of linear bearings, such as is illustrated in U.S. Pat. No. 3,329,227, issued July 4, 1967, in association with the axle and mounted idlers will, likewise, require a larger axle/idler wheel support structure and, accordingly, introduce unwanted vehicle weight, complexity, and cost.

Snowmobiles and other light duty belt driven vehicles require tensioning of their associated ground engagement belt members. Typical of such belt tensioning devices include those illustrated in U.S. Pat. Nos. 3,510,174, 3,597,017, 3,758,169, and 4,221,272, which respectivoly issued on May 5, 1970, Aug. 3, 1971, Sept. 11, 1973, and Sept. 9, 1980. Such tensioning devices tend to pull either the belt entrained idler or driver wheel member in a direction which tightens the belt. Such snowmobile belt tensioning devices move and fix such idler or driver at the desired tensioning position. Such fixed mounting is acceptable for light duty vehicles which operationally ingest small quantities of primarily flowable debris between the belt and the idler-/driver components. Moreover, snowmobiles typically utilize a single belt rather than the dual ground engagement members typically found on opposing lateral sides of a heavy-duty vehicular chassis. As a result, there is no requirement that such laterally oppositely disposed idlers have independent recoil capability. Accordingly, snowmobile axles supporting idler/driver wheels are typically not oscillatable about the snowmobile's longitudinal axis nor about a vertical axis through the axle.

U.S. Pat. No. 2,535,254 which issued Dec. 26, 1950, illustrates a tracked garden tractor having an entrained idler on either lateral side of the main frame which is biased away from the driver sprocket associated with it. The idlers are mounted on an axle which extends laterally across and through the vehicle's main frame but is constrained to longitudinal movement relative to the main frame and, thus, does not permit side-to-side oscillation of the axle relative to the main frame to accommodate lateral unevenness in the terrain which is commonly encountered in heavy-duty work applications.

The prior art's techniques for tensioning a track laying, heavy duty vehicle's endless track or a light duty, snowmobile type vehicle's belt do not apply to and are not adaptable to heavy-duty work vehicles which lack the traditionally used track roller frames and which utilize endless, elastomeric belts. The heavy-duty belted vehicles' performance requirements of permitting independent recoil of the laterally separated idler wheels, the side-to-side load sharing of the oscillatably-supported idler axle, and the ability to resist rotation of the axle about its lateral axis without the use of a roller frame which structurally supports each idler wheel cannot be satisfied by the prior art tensioning systems.

Accordingly, the present invention is directed to overcoming one or more of the problems previously set forth.

DISCLOSURE OF THE INVENTION

In one aspect of the present invention, a belt laying work vehicle is provided having a main frame, a laterally extending axle, a pair of longitudinally separated wheel structures arranged on each lateral side of and in supporting relation to the main frame with one wheel structure of each pair being mounted on opposite ends of the axle, an endless, inextensible belt entrained about each pair of wheel structures, apparatus pivotally mounting the axle on the vehicle's main frame about an oscillation axis parallel to the main frames longitudinal axis, and a belt tensioning apparatus for biasingly pulling the axle away from the other wheel structure of each pair. In another aspect of the present invention, a method for tensioning an endless, inextensible belt into frictional driven engagement with a radially outwardly facing surface of one of a pair of wheel structures which are arranged on each side of a vehicle main frame and which are entrained by the belt is provided and includes pulling a main frame mounted oscillatable axle on which the other wheel structure of each pair is mounted in a longitudinal direction away from the one wheel structures with an initial biasing force and increasing the biasing force in response to movement of the axle from its initial position toward the one wheel structures.

BRIEF DESCRIPTION OF THE DRAWINGS

FIGS. 2A and 2B are semi-schematic front and plan views, respectively, of an oscillatable, pivotable idler axle used by the vehicle of FIG. 1 illustrating in phantom lateral oscillation of the axle and longitudinal recoil of the axle, respectively;

FIG. 3 is a partial sectional view of the vehicle's idler axle, associated idler wheels, and belt tensioning device taken along section line III—III of FIG. 1;

BEST MODE FOR CARRYING OUT THE INVENTION

Figure 1:
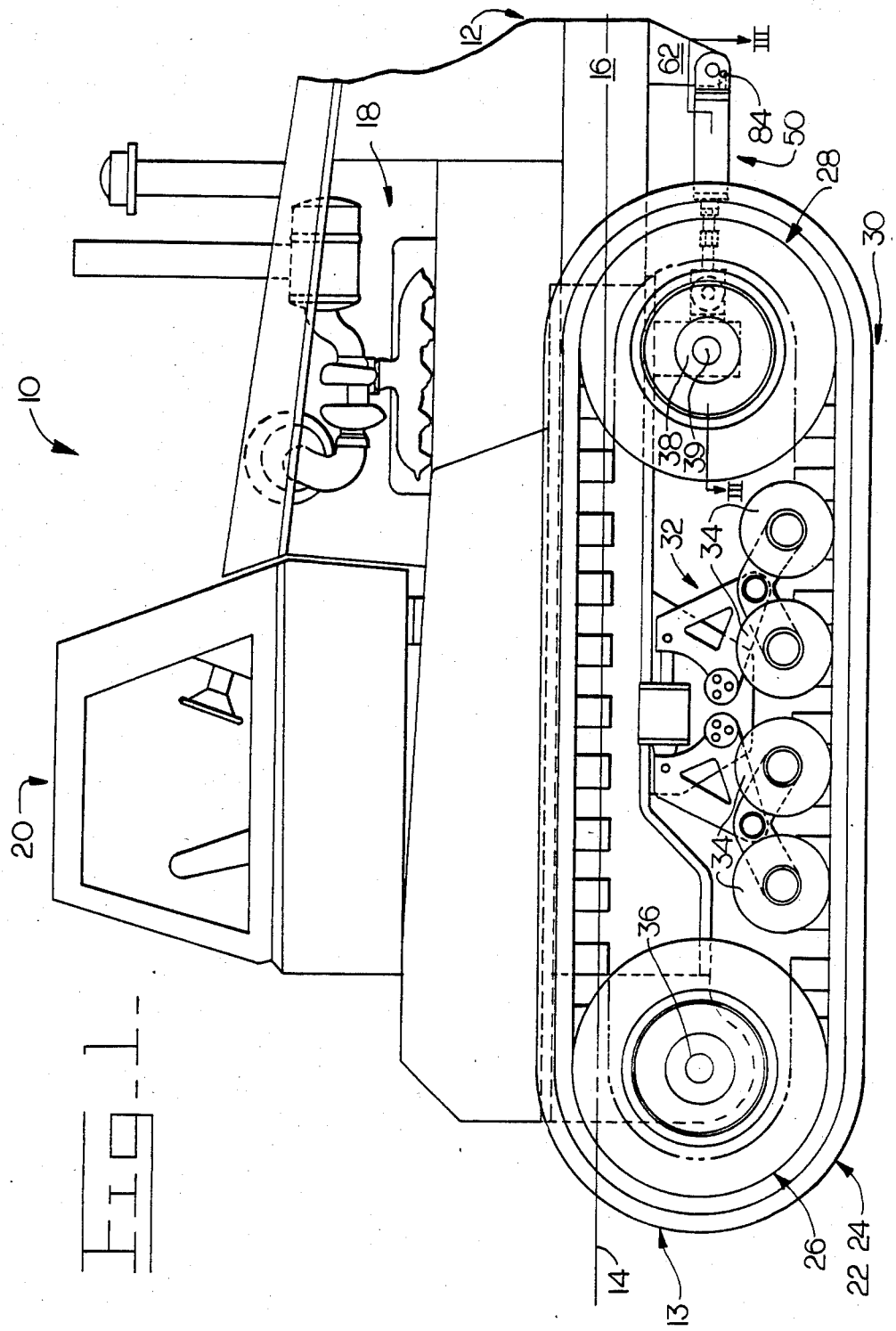
FIG. 1 is a side elevation view of an exemplary belt laying work vehicle.

Referring now to FIG. 1, a heavy-duty belt laying work vehicle 10 is illustrated having a chassis 12 and an undercarriage 13 arranged in supporting relation to the chassis 12. The chassis 12 has a longitudinal axis 14 and includes a main frame 16, an engine 18, and an operator station 20. The undercarriage 13 includes a pair of running gears 22,24 of which running gear 22 is arranged on the near side of the chassis 12 (as seen in FIG. 1) and running gear 24, identical to running gear 22, is disposed on the opposite lateral side of the chassis 12 not directly viewable from the vantage point of FIG. 1. Insofar as there is substantial identity between the running gears 22 and 24, description and reference will hereafter be made primarily to running gear 22 and its components. The running gear 22 includes a driver wheel structure 26 disposed near the rear of the chassis 12, an idler wheel structure 28 disposed near the front end of the chassis 12, an endless, inextensible elastomeric belt 30 entrained about and in engagement with the wheel structures, and a roller system 32 suspended from the main frame 16 longitudinally between the wheel structures 26,28. The roller system 32 includes rollers 34 which are engageable with the interior surface of the belt 30.

The driver wheel structure 26 is mounted on the near end (from the vantage point of FIG. 1) of a drive shaft 36 which is rotatably supported by the main frame 16 and which is driven in an operator-selected direction and at an operator selected speed by the engine 18 through a drive train (not shown). The idler wheel structure 28 is mounted on the near end (from the vantage point of FIG. 1) of an axle 38 which extends laterally under the chassis 12 and has an axis of rotation 39. A similar idler wheel structure 29 is mounted on the far end of the axle 38. The idler axle 38 is oscillatably mounted about an oscillation axis 40 which is parallel to the chassis' longitudinal axis 14 and is best illustrated in FIGS. 2A and 3.

FIG. 2A is a semi-schematic view of the axle 38 and idler wheel structures 28,29 as viewed from a vantage point in front of the chassis 12. The phantom illustrations of the axle 38 and idler structures 28,29 depict the assumable configurations when laterally uneven terrain is encountered by the vehicle 10. The illustrated oscillation about the oscillation axis 40 promotes load sharing between the idler wheel structures 28,29 and minimizes the vertical distance the supported chassis 12 moves.

FIG. 2B is a semi-schematic view of the axle 38 and idler wheel structures 28,29 as viewed from above same.

The normal, operating position is illustrated in full while the phantom representations are illustrative of axle/idler configurations assumable during recoil operation induced by obstacle engagement or by debris intrusion between the belt 30 and any of the running gear components. As illustrated, one or both idler wheel structures 28,29 can move longitudinally rearwardly toward their associated driver wheel structure 26 during such recoil. When both idler wheel structures 28,29 recoil, the axle 38 temporarily moves to a position parallel to the position occupied during normal operation (shown in full). When, however, one idler wheel structure recoils to a greater extent than the other, the axle 38 will temporarily pivot about a vertical pivot axis 42.

The means by which the oscillation/pivoting motions of the axle 38 are provided is best seen in FIG. 3 where a pivot pin 44 is exemplified as being fixedly mounted to longitudinally separated portions of the main frame 16 and having its pivot axis 46 coincident with the longitudinal axis 14 and oscillation axis 40. The inner race of a bearing 48 is slidably mounted on the pivot pin 44 and the outer race of the bearing 48 is fixedly mounted on the axle structure 38. The bearing 48 and pivot pin 44 together provide the axle 38 with the operational degrees of freedom (illustrated in FIGS. 2A and 2B) which are required to accommodate laterally uneven terrain and enable substantially independent recoil of the idler wheel structures 28,29.

The elastomeric belts 30 are tensioned into frictional driven engagement with the respective driver wheel structures 26 by belt tensioning means such as a pair of spring assemblies 50 arranged on opposite lateral sides of the oscillation axis 40 with each spring assembly 50 having a first, connecting end 52 joined to the axle structure 38 and a second, connecting end 54 joined to the main frame 16. A pin 56 is disposed through an axle support ear 58 which constitutes a portion of the axle structure 38 and extends longitudinally forwardly. A second pin 60 extends through a main frame support ear 62 which constitutes a portion of the main frame 16 and extends downwardly.

Inasmuch as the spring assemblies 50 are identical, only one such spring assembly 50 will be described. The spring assembly 50 includes a cylinder portion 64 which is joined to the pin 60 by a spherical bearing 66. A piston structure 68 constitutes a portion of the spring assembly 50 and is longitudinally reciprocatably disposed in the cylinder 64. The piston structure 68 includes a piston 69, a rod assembly 70 which is joined to the piston 69 and extends from one end of the cylinder 64, and a wear ring 71 disposed about the piston 69 and in contact with the piston 69 and cylinder 64. The rod assembly 70 includes a rod yoke 72 attached to the axle support ear 58 by the pin 56, a rod 74 attached to the piston 69, and a rod adjuster 76 in threaded engagement with the rod yoke 72 and rod 74. A seal 77 is disposed in the cylinder 64 in sealing relation with the cylinder 64 and rod 74. A spherical bearing 78 is arranged between and connected to the axle support ear 58 and the axle connection pin 56 for reasons to be discussed hereinafter. The spring assembly 50 further includes a compression spring 80 housed within the cylinder 64 between one end thereof and the piston structure 68, but it is to be understood that a tension spring could, with equal facility, be joined to the piston structure 68 at the end of the cylinder 64 which is joined to the main frame 16. A fluid fitting 84 connected with one end of the cylinder 64 in cooperation with a passage 86 through the cylinder 64 and a plurality of ports 87 in the piston 69 permits pressurized fluid to be transmitted into a chamber 88 defined by the piston structure 68, seal 77, spring 80, and cylinder 64. A jam nut 90, threadably engaged with the rod adjuster 76, is abuttable with the rod 74.

The axle connection pin 56 has a connection axis 57 which extends laterally at a longitudinal location in front of the axle's axis of rotation 39 to pullingly bias the axle 38 relative to the associated driver wheel structure 26 rather than pushingly bias the idlers 28,29 as is customary in the case of track-type tractors. The points of force application for the spherical bearings 48,78,66 are designated A, B, and C, respectively, in FIG. 3.

Figure 4A:
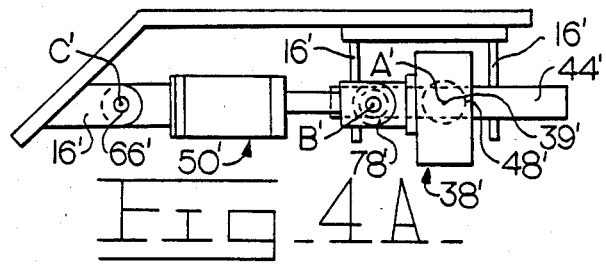
FIGS. 4A and 4B are side views of an idler axle/pushing tensioning device and the present invention's idler axle/pulling tensioning device, respectively.
Figure 4B:
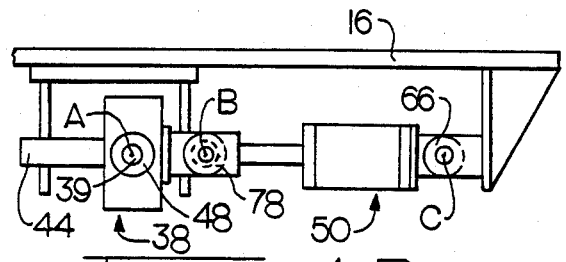

FIGS. 4A and 4B respectively illustrate "pushing" belt tensioning means 50' and "pulling" belt tensioning means 50. In FIG. 4A an axle 38' is connected at its rear side through a spherical bearing 78' to one end of belt tensioning means 50'. The other end of belt tensioning means 50' is connected to a main frame 16' through another spherical bearing 66'. The axle 38' is supported on a pivot pin 44' through a spherical bearing 48' and the pivot pin 44' is attached to the main frame 16'. The respective points of force application for the bearings 48',78' and 66' are A', B', and C'. For purposes of comparing the "pushing" belt apparatus tensioning of FIG. 4A to the "pulling" belt tensioning apparatus of FIG. 4B, the structure of the elements labeled with primed (') reference numerals and letters may be considered substantially identical with the elements labeled with the same, but unprimed reference numerals and letters except, of course, that the biasing force for tensioning means 50' is applied to the rear of the axle instead of to the front of the axle.

Figure 5A:
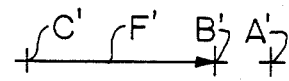
FIGS. 5A and 5B are vector diagrams of the belt tensioning force and its points of application for the idler axle/belt tensioning devices of FIGS. 4A and 4B, respectively, during ideal operating conditions.
Figure 5B:
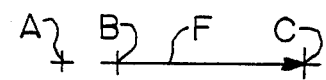

FIGS. 5A and 5B constitute vector diagrams for the structures illustrated in FIGS. 4A and 4B, respectively, when those structures are subjected to ideal operating conditions in which the points A, B, and C and A', B', and C' are colinear. The tensioning forces F applied by the structures illustrated in FIGS. 4A and 4B are in a pushing and pulling mode, respectively, for FIGS. 5A and 5B.

Figure 6:
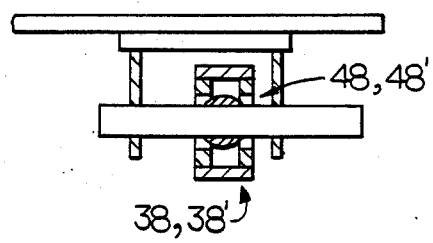
FIG. 6 is a sectional view of the axle/bearing structure shown in FIGS. 4A and 4B when such structures are subjected to the forces respectively depicted in FIGS. 5A and 5B.

FIG. 6 illustrates the configuration assumed by the axle/bearing structure 38/48,38'/48' of FIGS. 4A and 4B when they are subjected to the ideal operating conditions indicated in the vector diagrams of FIGS. 5A and 5B.

Figure 7A:
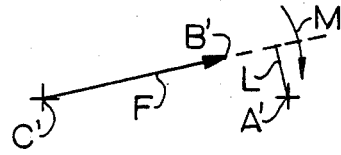
FIGS. 7A and 7B are vector diagrams illustrating the belt tensioning forces and points of application for the idler axle/tensioning devices illustrated in FIGS. 4A and 4B, respectively, during typical operating conditions.
Figure 7B:
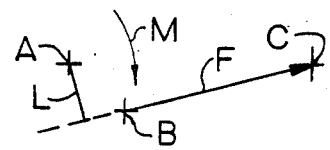

FIGS. 7A and 7B are vector diagrams respectively representing actual operating conditions for the "pushing" belt tensioning of FIG. 4A and the "pulling" belt tensioning of FIG. 4B when an external torque M such as wheel bearing drag or brake reaction is applied to the axle 38,38'.

Figure 8:
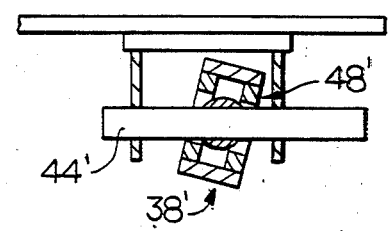
FIG. 8 is a sectional view of the idler axle/bearing structure shown in FIG. 4A when such structure is subjected to the forces depicted in FIG. 7A.

FIG. 8 illustrates the bearing 48' and associated axle 38' when the "pushing" belt tensioning apparatus of FIG. 4A is subjected to the operating forces/torques illustrated in FIG. 7A. In FIG. 8 the outer race of the bearing 48' has rotated to such a point that it is engaged with the pivot pin 44'. Upon further rotation, the bearing's outer race, pivot pin 44', or both will sustain damage. The axle 38', in moving from the configuration corresponding to the ideal operating conditions (FIG. 6) to the configuration illustrated in FIG. 8, rotated about its rotation axis 39' under the influence of the external torque M. Thereafter, the biasing force F is exerted on the point B' at a moment arm distance of L to further rotate the axle 38' and aggravate the already unsatisfactory condition. Such further rotation continues until the axle/bearing assumes the damaging configuration of FIG. 8. FIG. 6, on the other hand, represents the configuration assumed by the bearing 48/associated axle 38 upon application of an external torque M (such as a wheel bearing drag or brake reaction) to such axle as vectorially depicted in FIG. 7B. The biasing pulling force F of FIG. 7B, unlike that of FIG. 7A, tends to self-correct any rotation of the axle 38 in response to the externally applied torque M. As such, instead of aggravating the already unfavorable orientation of the bearing 48 relative to the pivot pin 44, the biasing pulling force exerted by the tensioning apparatus of FIG. 4B tends to resist such externally applied torque by returning the points A, B, and C to a colinear relationship.

When appropriately rotated, the rod adjuster 76, due to its threaded engagement with the yoke 72 and the rod 74, causes the two rod portions 72,74 to longitudinally approach one another whereas rotation in the opposite direction causes those same rod portions 72,74 to move away from one another. Such relative movement is, in the preferred embodiment, provided by arranging opposite hand threads on opposite ends of the adjuster 74 and on the yoke 72 and rod 74. The spherical, belt tightening apparatus connector bearings 66,78 permit the spring assemblies 50 to move with and thus accommodate the complex movement imposed on the axle structure 38 during normal operating conditions.

Industrial Applicability

Tension in each belt 30 is preferably adjusted to the desired magnitude by transmitting pressurized fluid through the fluid fitting 84, passage 86, and into the pressurizable chamber 88 causing the piston structure 68 to move in a direction toward the axle 38 and compress the spring 80 either from its free length when the spring assembly 50 is first installed or from a reduced length if already installed. The ports 87 in the piston 69 allow the pressurized fluid to occupy both longitudinal sides of the piston 69 which, during the tensioning adjustment procedure, limits the force generated on the piston 69 by the pressurized fluid to the axial surface area of the rod 74.

The preferred belt tensioning procedure involves transmitting pressurized fluid through the fitting 84 into the chamber 88 until complete extension of the rod 74 is achieved (either before or after the spring assemblies 50 are attached to the axle 38 and the main frame 16). A locking device, as is well-known in the art, is then installed on the spring assembly 50 to prevent complete retraction of the rod 74 into the cylinder 64 in the event that chamber 88 is inadvertently depressurized during the following portions of the tensioning adjustment procedure. Since the protrusion distance of the rod 74 beyond the cylinder 64 is indicative of the spring length, since the spring's length (compared with its free length) is indicative of the spring's biasing force, and since the spring's biasing force is indicative of the belt tension, maintaining a predetermined protrusion X of the rod 74 after depressurizing the chamber 88 provides the desired belt tension and degree of frictional coupling between the belt 30 and drive wheel 26.

Although the spring's biasing force is more easily adjusted during chamber 88 pressurization, the biasing force actually exerted by the spring (as indicated by rod protrusion beyond the cylinder 64) on the axle 38 can only be determined when the chamber 88 has been depressurized and the axle 38 occupies its initial operating position. Accordingly, during chamber pressurization, the rod adjuster 76 is rotated in the appropriate direction to either increase or decrease the spring's biasing force until a predetermined separation distance obtains between the yoke 72 and the rod 74. If the axle 38, belt 30, and wheel structures 26,28 are within acceptable dimensional tolerances, such separation distance will, upon depressurizing the chamber 88, provide the predetermined rod protrusion distance X. Subsequently the locking device is removed and the chamber 88 is depressurized and partially drained to permit the piston structure 26 to move away from the driver wheel structure 26 under the biasing force of the spring 80 until the spring's biasing force substantially equals double the tension force in the associated belt 30. If, after chamber depressurization, the rod 74 protrudes the predetermined distance X beyond the cylinder 64, the belt tension is correct. If the protrusion is not equal to the predetermined distance, the chamber 88 must be repressurized, the rod adjuster 76 rotated in the appropriate direction to adjust the protrusion, the chamber 88 depressurized and partially drained, and the protrusion distance remeasured until such actual protrusion distance equals the desired, predetermined protrusion distance X. Due to the substantially inextensible character of the belt 30, the actual longitudinal position of the axle 38 does not appreciably change when the belt 30 is tensioned in a manner sufficient to remove all slack therein.

When the final protrusion of the rod 74 equals the desired protrusion X, the jam nut 90 is rotated until it engages the rod 74 and thus locks the rod adjuster 76 to the rod 74. Thereafter, sufficient pressurizing fluid is drained from the cylinder 64 to permit the spring 80 to induce further retraction of the rod 74 upon deflation of one or both idler wheel structures 28 and thus maintain engagement between the belt 30 and the entrained wheel structures 26,28. Of course, the biasing force adjustment must be performed for each spring assembly 50. However, due to the recoil capability of the axle 38 (as illustrated in FIG. 2B), a change in the force exerted by one spring assembly 50 changes the force exerted by the other spring assembly 50. Accordingly, the aforementioned biasing force adjustment must be performed in an iterative manner on the two spring assemblies 50 until the previously described equality condition obtains within a reasonable tolerance on both spring assemblies 50. It is to be understood that the rod adjusters 76 may be appropriately rotated until the rod protrusion equality obtains without first pressurizing the chambers 88. The preferred iterative, trial and error procedure for achieving the aforementioned rod protrusion equality is, thus, eliminated but the effort required to rotate the rod adjusters 76 without benefit of pressurizing the chambers 88 is dramatically greater.

During operation of the exemplary belt laying work vehicle 10, the terrain on opposite lateral sides of the chassis 12 is frequently not the same elevation. When such uneven terrain is encountered, the axle 38 responds by oscillating about the pivot pin 44 in a manner similar to that shown in FIG. 2A. Such axle oscillation causes the idler wheels 28,29 to share in the load transmitted to them by the vehicle, permits the vehicle's frame 16 and thus center of gravity to remain closer to the ground than is possible with solidly mounted idler structures, and maximizes the belts' footprints and tractive effort.

Another adverse condition frequently encountered in heavy-duty work environments is debris intrusion between the belt 30 and the entrained idler wheel structure 28, driver wheel structure 26, and/or rollers 34. It is necessary to operationally accommodate such debris intrusion without subjecting the aforementioned, entrained components to excessive stress. The axle's pivoting connection to the main frame 16 about the vertical pivot axis 42 (as schematically represented in FIG. 2B), enables substantially independent or simultaneous recoil operation of the idler wheel structures 28,29 and prevents such excessive stress from occurring. Pressurizing fluid remaining in the cylinder 64 lubricates the wear ring 71 and seal 77 during recoil operation.

It is, of course, to be understood that the actual movement during operation of the axle structure 38 and mounted idler wheel structures 28,29 may be a combination of the separate movements illustrated in FIGS. 2A and 2B. Such complex movement of the individual idler wheel structures 28,29 relative to their associated driver wheels 26 will induce the elastomeric belt 30 to assume somewhat twisted configurations while maintaining maximum tractive engagement area with the terrain.

The spherical bearing 48 and pivot pin 44 cooperatively permit the axle 38/idlers 28,29 to assume the configurations illustrated in FIGS. 2A and 2B and any combination thereof. By virtue of the bearing 48/pin 44 structure permitting attainment of such varied axle configurations, undesired rotation of the axle 38 about its lateral axis of rotation 39 is also permitted and can result in damage to the aforementioned bearing/pin structure 48,44. The spring assemblies 50 through their pullingly biasing relationship with the axle 38, however, exert a correcting torque on the axle 38 to counteract externally applied torques which tend to rotate the axle. The spring assemblies 50, due to their pulling relationship to the axle 38, resist rotation of the axle 38 about its axis 39 and prevent damage to the bearing/pin structure 48,44 as illustrated in the vector diagram of FIG. 7B. Connection of the spring assemblies 50 to the axle 38 and main frame 16 through spherical bearings 78,66, respectively, permit the spring assemblies 50 to continuously exert such pulling biasing force on the axle 38 for any of the axle configurations or combinations thereof shown in FIGS. 2A and 2B.

Due to the spring constants of the spring assemblies 50, increasing idler recoil distance (idler displacement toward its associated driver) induces increasing belt tension which squeezes and expels debris collected on the belt's interior and entrained components' exteriors. Gradual increases in biasing force by the spring assemblies 50 for gradually increasing recoil displacement augments debris expulsion capability and avoids subjecting the axle 38, entrained components, and entraining belt to the degree of impact loading which a hydraulically applied tensioning apparatus typically provides when it is at the end of its recoil movement.

Use of a mechanical, spring type tensioning apparatus 50 is also preferable over a hydraulically applied tensioning apparatus because no long-term reliance is placed on hydraulic seal members for maintaining the tensioning pressure and thus belt tension. Long-term maintenance of belt tension is required to insure sufficient frictional coupling between the belts 30 and the driver/idler structures 26,28 when the vehicle 10 is parked on an incline and shut down for extended periods. Without maintaining such frictional coupling during vehicle shutdown, the wheel structures 26,28 may slide relative to the entraining belt 30 and thus permit the vehicle 10 to move down an incline even when the vehicle brake is engaged.

It should now be apparent that an improved, heavy-duty belt laying work vehicle as well as method and apparatus for tensioning its frictionally driven, ground engaging elastomeric belts 30 has been provided in which the tension force in the belts 30 is reliably maintained at a desired magnitude during vehicle shutdown, maximum belt/ground engagement area is maintained for varying terrain conditions, and debris intrusion between entrained components 26,28,34 and the entraining belt 30 is operationally accommodated without subjecting either to undue stress. Despite the idler axle 38's capability of movement in multiple directions, potentially damaging torques applied to the axle 38 about the axle's rotation axis 39 are effectively resisted by the pulling biasing force exerted on the axle 38 by the spring assemblies 50. Any desired belt tension within the capabilities of the biasing springs 80 may be achieved by sequentially transmitting pressurized fluid from vehicle-resident or other sources through the fluid fittings 84 to counteract the force exerted on the rod adjusters 76 by the springs 80, appropriately rotating the rod adjusters 76, and releasing the fluid pressure.

I claim:
1. A belt laying work vehicle comprising:
a main frame having a longitudinal axis;
a laterally extending rigid axle having an axis of rotation;
a pair of longitudinally separated wheel structures disposed on each lateral side of and in supporting relation to said main frame, a first wheel structure of each pair being mounted on opposite ends of said axle and constrained to rotate about the axis of rotation;
an endless, inextensible elastomeric belt entrained about each pair of wheel structures;
means for oscillatably mounting said axle on the main frame about an oscillation axis parallel to said longitudinal axis; and
tensioning means for biasingly pulling said axle away from each pair's other wheel structure.

2. The belt laying work vehicle of claim 1 wherein said axle mounting means comprises:
means for universally swivelling said axle relative to said main frame.

3. The belt laying work vehicle of claim 1 wherein said axle mounting means comprises:
a pivot pin attached to one of said axle and said main frame; and
a universally swivelling bearing slidably mounted on said pin and fixedly mounted on the other of said axle and main frame.

4. The belt laying work vehicle of claim 3 wherein said pivot pin has an axis which constitutes said oscillation axis.

5. The belt laying work vehicle of claim 1 wherein said tensioning means exerts increasing pulling force on said axle with increasing displacement of said axle toward said other wheel structures.

6. The belt laying work vehicle of claim 1 wherein said tensioning means comprises:
a pair of spring assemblies each having a first end connected to said axle on opposite lateral sides of said oscillation axis and a second end connected to said main frame on the opposite longitudinal side of the axle from said other wheel structures.

7. The belt laying work vehicle of claim 6 wherein each spring assembly comprises:

a cylinder having one end connected to one of said main frame and said axle;

a piston structure reciprocatably displaceable in said cylinder and having a rod assembly connected to the other of said main frame and said axle; and a spring disposed in said cylinder and having opposite ends engaged with said cylinder and said piston structure, said spring biasing said piston structure toward said one cylinder end.

8. The belt laying work vehicle of claim 7 wherein said rod assembly comprises:

a piston rod;

a yoke; and means for adjusting the distance between said rod and said yoke.

9. The belt laying work vehicle of claim 8 wherein said adjustment means comprises:

a shaft threadably engaged with said rod and said yoke; and means for locking said shaft form rotating relative to one of said rod and yoke.

10. The belt laying vehicle of claim 6 wherein said spring assemblies are connected to said axle laterally between said first wheel structures.

11. A belt tensioning apparatus for biasing an idler wheel structure away from an associated driver wheel structure, both of said structures being entrained by an endless inextensible elastomeric belt, and being arranged in supporting relation to a vehicular main frame, said apparatus comprising:

a rigid axle universally swivellably mounted on said main frame and on which said idler wheel structure is rotatably mounted; and a spring assembly connected between the axle and main frame and arranged to exert a pulling force on said axle away from the driver wheel structure, said spring assembly including a cylinder having one end connected to one of said main frame and said axle, a piston structure reciprocatably disposed in said cylinder and having a rod assembly connected to the other of said main frame and said axle, and spring disposed in said cylinder and having opposite ends engaged with said cylinder and said piston structure, said spring biasing said piston structure toward said cylinder's one end.

12. The belt laying work vehicle of claim 11 further comprising:

means independent of said rod assembly for displacing said piston structure away from said cylinder's one end.

13. The belt laying work vehicle of claim 11 further comprising:

means for adjusting said spring's biasing force.

14. A method for tensioning an endless, inextensible elastomeric belt into frictional driven engagement with one of a pair of wheel structures which are entrained by said belt and which are arranged in supporting relation to a vehicular main frame, comprising:

pullingly biasing a main frame mounted, universally swivelable axle on which the other wheel structure is mounted in a longitudinal direction away from the one wheel structure with a predetermined biasing force when the axle occupies an initial position; and increasing the biasing force in response to movement of the axle from the initial position toward the one wheel structure.

15. The method of claim 14 wherein said pullingly biasing the axle comprises:

changing the length of a spring which is engaged with a piston structure and with a cylinder which are respectively connectable to one member and the other of said axle and frame such that when the axle occupies said initial position said spring's length equals a biasing length corresponding to the predetermined biasing force.

16. The method of claim 15 wherein said spring length changing comprises:

measuring the protrusion distance which a piston rod of said piston structure extends beyond the end of the cylinder when said axle occupies the initial position;

rotating a rod adjuster threadably engaged with said one member and said piston rod whenever the protrusion distance is not substantially equal to a predetermined protrusion distance which corresponds to said spring's biasing length.

17. The method of claim 16 further comprising:

counteracting the spring's biasing force on the rod adjuster during such rotating.

18. The method of claim 17 wherein said counteracting comprises:

displacing said piston structure against the biasing force by transmitting pressurized fluid into said cylinder.

19. The method of claim 18 wherein the other of said wheel structures is pneumatic, said method comprising:

subsequent to the protrusion distance equaling the predetermined protrusion distance, draining sufficient pressurized fluid from the cylinder to permit sufficient movement of said piston structure to maintain engagement between the belt and wheel structures upon deflation of the other wheel structure.

20. The method of claim 16 further comprising:

locking the rod adjuster against rotation relative to one of the one member and the piston rod subsequent to such rotating.

21. A belt laying work vehicle comprising:

a main frame having a longitudinal axis;

a laterally extending axle having an axis of rotation;

a pair of longitudinally separated wheel structures disposed on each lateral side of and in supporting relation to said main frame, one wheel structure of each pair being rotatably mounted on said axle;

an endless, inextensible elastomeric belt entrained about each pair of wheel structures;

means for universally swivellably mounting said axle on said main frame; and tensioning means for biasingly pulling said axle away from each pair's other wheel structure.

* * * * *